United States Patent
Klosiewicz

(10) Patent No.: US 6,432,496 B1
(45) Date of Patent: *Aug. 13, 2002

(54) HIGH DENSITY POLYETHYLENE FILMS WITH IMPROVED BARRIER PROPERTIES

(75) Inventor: Daniel W. Klosiewicz, Wilmington, DE (US)

(73) Assignee: Eastman Chemical Company, Kingsport, TN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/103,689

(22) Filed: Jun. 5, 1998

Related U.S. Application Data

(60) Provisional application No. 60/048,924, filed on Jun. 6, 1997.

(51) Int. Cl.$^7$ .............................. C08L 23/06; C08J 5/18
(52) U.S. Cl. .................... 428/36.92; 428/910; 524/570; 524/587; 525/211; 525/240
(58) Field of Search ................................. 525/211, 240; 524/570, 587; 428/36.92, 910

(56) References Cited

U.S. PATENT DOCUMENTS

| | | | |
|---|---|---|---|
| 4,545,950 A | | 10/1985 | Mottoka et al. |
| 4,957,679 A | | 9/1990 | Moore |
| 5,043,204 A | * | 8/1991 | Itaba et al. .................. 428/213 |
| 5,075,156 A | * | 12/1991 | Tanaka et al. .............. 428/212 |
| 5,128,183 A | * | 7/1992 | Buzio ........................ 428/35.7 |
| 5,290,842 A | * | 3/1994 | Sasaki et al. ................ 524/271 |

* cited by examiner

*Primary Examiner*—D. R. Wilson
(74) *Attorney, Agent, or Firm*—B. J. Boshears; Bernard J. Graves, Jr.

(57) ABSTRACT

This invention relates High Density Polyethylene (HDPE) films having improved barrier properties. More particularly, the invention relates to HDPE films containing hydrocarbon resins having improved moisture barrier. The invention also relates to masterbatches for use in producing High Density Polyethylene films having improved barrier properties.

16 Claims, No Drawings

HIGH DENSITY POLYETHYLENE FILMS WITH IMPROVED BARRIER PROPERTIES

CROSS REFERENCE TO RELATED APPLICATION

This application claims the benefit of U.S. Provisional Application No. 60/048,924 filed on Jun. 6, 1997, the disclosure of which is incorporated by reference.

FIELD OF THE INVENTION

This invention relates High Density Polyethylene (HDPE) films having improved barrier properties. More particularly, the invention relates to HDPE films containing hydrocarbon resins having improved moisture barrier, and the process of making said films.

BACKGROUND OF THE INVENTION

Polyolefins are plastic materials useful for making a wide variety of valued products due to their combination of stiffness, ductility, barrier properties, temperature resistance, optical properties, availability, and low cost.

The use of terpene and hydrogenated hydrocarbon resins as modifiers for polypropylene (PP) converted into oriented film is well known. Some of the attributes assigned to the use of low molecular weight resin products in polypropylene films, include good optical properties, improved processing when making oriented films, better sealing characteristics, and desirable mechanical properties and converting characteristics.

The use of hydrocarbon resins (HCR) for improving the moisture barrier properties of oriented polypropylene is also well known. The effectiveness of resin for improving barrier properties is expected to be highly dependent on the characteristics of the PP itself. These characteristics include the degree of crystallinity of the PP, the compatibility of the resin with the polypropylene amorphous regions and the amorphous region's glass transition.

Additionally, it has been generally known that high levels of hydrocarbon resin were required to cause substantial improvements in barrier properties of polypropylene film, typically in the range 5% to 25% by weight. However, adding resin at these levels typically embrittles non-oriented PP film to an excessive degree. In oriented polypropylene (OPP) film, the orientation imparted to the polymer offsets the negative effect of the resin on ductility, so that films with good mechanical properties can be produced at the high loadings of hydrocarbon resin required to impart improvements in barrier properties.

Because of differences between ethylene polymers and polypropylene in crystallinity level, glass transition temperature, and amorphous character (linear vs. branched aliphatic structure), the effects of hydrocarbon resins in polyethylene films can not be strictly predicted based on analogy with oriented polypropylene films. Additionally, because most polyethylene films possess a relatively low degree of molecular orientation as compared to OPP films, the ability to incorporate hydrocarbon resins in polyethylene films at an effective level without ruining mechanical properties is an area of concern.

High density polyethylene (HDPE) is nominally a linear homopolymer of ethylene containing few branch points in the polymer chain. As a result of its regular structure, HDPE is a highly crystalline material with a peak crystalline melting point typically around 135° C. Various types of HDPE are characterized by the density of the material, which ranges typically from 0.940 to 0.965 (g/cc). Density is a measure of the crystallinity developed by the HDPE material, where higher density relates to higher the level of crystallinity developed by the polymer. Mechanical properties and barrier properties are strongly influenced by the degree of crystallinity developed in the HDPE polymer.

Typical uses are in the production of blow molded containers such as milk bottles, molded articles, lightweight consumer bags and trash bags, and various types of film products.

One example of a HDPE film product is the inside liner used to package cereal products. In this and similar packaging applications, superior barrier properties of the HDPE, relative to non-oriented PP or low density PE films, is a very positive attribute of the HDPE film. One type of barrier property refers to preventing the permeation of moisture either in or out of the packaged food product.

The need exists for a method for a method for the incorporation of various hydrocarbon resins into high density polyethylene polymers (HDPE). The need also exists for films which possess superior barrier properties and still retain desirable mechanical properties such that the films can be used for packaging film applications where improved barrier properties of these films have value. Additionally, the need exists for a highly efficient process for producing films of HDPE modified with hydrocarbon resin. It has been found that by adding various types of hydrocarbon resins to HDPE polymer to form a blend, and forming a film from the blend, a superior packaging film can be produced with improved moisture barrier properties than films produced from the HDPE polymer by itself. These improved barrier films have value in packaging applications where a reduced rate of moisture loss (or gain) increases the shelf life of the packaged material. In the opposite sense, by improving the barrier properties of the HDPE film the thickness of the film used to package a material may be reduced, lowering the amount of packaging material required, and, as a result, reducing the amount of refuse derived from packaging film.

SUMMARY OF THE INVENTION

A polyethylene film comprising about 3% to about 25% by weight of a resin and about 97% to about 75% by weight of a polyethylene. The resin has a weight average molecular weight Mw of less than about 10,000 Daltons, as determined using size exclusion chromatography (SEC) using polystyrene as a standard. Resins of Mw less than 5,000 Daltons being preferred, for example resins having Mw of at least about 500 Daltons to about 2,000 Daltons being most preferred. The polyethylene has a density in the range from about 0.940 to about 0.970 g/cc, as measured at 23° C. according to ASTM D1505. Barrier properties improve as density or crystallinity of the, preferably from about 0.940 to about 0.965 g/cc. Preferably, the film comprises about 3% to about 15% of the hydrocarbon resin.

The resin further comprises hydrocarbon resin derived by thermally polymerizing olefin feeds rich in dicyclopentadiene (DCPD). Alternatively, the resin may be hydrocarbon resin derived from the polymerization of a C9 hydrocarbon feed stream. Either of the above hydrocarbon resins may be either fully or partially hydrogenated.

Alternatively, the hydrocarbon resin may be resin derived from polymerization of pure monomers, wherein the pure monomers are selected from the group consisting of such as styrene, a-methylstyrene, 4-methylstyrene and vinyltoluene.

Alternatively, the resin may be produced from terpene olefins.

The polyethylene film may comprises a cast film or an oriented film. If the polyethylene film comprises an oriented film, it may comprise a monoaxial or biaxial oriented film. The biaxially oriented film may be produced through a blown film process or through a tenter frame orientation process.

The invention also relates to a masterbatch for the production of polyethylene films, its preparation and the use of the masterbatch wherein the masterbatch comprises a resin and an ethylene polymer wherein the resin has a weight average molecular weight Mw of less than about 10,000 Daltons, as determined using size exclusion chromatography (SEC) using polystyrene as a standard. Resins of Mw less than 5,000 Daltons being preferred, for example resins having Mw of at least about 500 Daltons to about 2,000 Daltons being most preferred. The ethylene polymer has a density in the range from about 0.87 to about 0.965, as measured at 23° C. according to ASTM D1505. The masterbatch further comprises about 2% to about 25% by weight ethylene polymer and about 98% to about 75% by weight resin. Preferably, the masterbatch comprises about 70 to about 80% by weight resin.

The invention also relates to a process of producing a polyethylene film comprising the steps of a) blending a polyethylene with a resin to form a blend, and b) extruding the blend to form a film. The film comprises about 3% to about 25% by weight of a resin and about 97% to about 75% by weight of a polyethylene wherein the resin has a weight average molecular weight Mw of less than about 10,000 Daltons, as determined using size exclusion chromatography (SEC) using polystyrene as a standard, preferably resins of Mw less than 5,000 Daltons, more preferably resins of Mw at least about 500 Daltons to about 2,000 Daltons. The polyethylene has a density in the range from about 0.95 to about 0.965 g/cc, as measured at 23° C. according to ASTM D1505.

Preferably, in the process of producing the polyethylene film, the resin is a hydrocarbon resin and is added to the film in the form of a masterbatch wherein the masterbatch comprises a hydrocarbon resin and an ethylene polymer wherein the hydrocarbon resin has a Mw of less than about 5000 Daltons and wherein the ethylene polymer has a density in the range from about 0.87 to about 0.965 g/cc. Preferably, the masterbatch further comprises about 2% to about 25% by weight ethylene polymer and about 98% to about 75% by weight hydrocarbon resin.

DETAILED DESCRIPTION OF THE INVENTION

Most packaging films made from HDPE polymers are produced by a blown film or cast film process. Less is produced by the orientation process used to make OPP packaging films from polypropylene. This invention also relates to methods for improving the barrier properties of HDPE films by incorporation of resins into the polymer formulation. Additionally this invention relates to a method for incorporating resins into the HDPE film. Because of low melt viscosity of applicable resins (relative to the HDPE polymer) blending resin into HDPE during film forming process is difficult and special addition techniques are necessary.

It is known that various types of resins, including hydrocarbon resins, may be added to PP polymer formulations which are subsequently converted into oriented film (OPP film) to improve barrier properties of the modified film. The preferred resins for this application are fully hydrogenated products derived from the polymerization of various olefin hydrocarbon feedstocks. Examples of useful resin products are Regalites® R-125 resin (Hercules Incorporated, Middelburg, The Netherlands), made by hydrogenating a polymerization product derived from a C9 hydrocarbon feedstock, Piccolytes® C 125 resin (Hercules Incorporated, Wilmington, Del.) produced by polymerizing a terpene feedstock comprised primarily of limonene, or hydrogenated resins derived from the thermal polymerization of a dicyclopentadiene (DCPD) rich feedstock, such as Plastolyn® 140 resin (Hercules Incorporated, Wilmington, Del.) or Escorez® 5320 resin (Exxon Chemical Corporation). In these instances, resin has a particular interaction with the amorphous part of the PP polymer into which the resin combines, which reduces the ability of moisture to permeate through the polymer.

Also, it is well known to use hydrocarbon resins in OPP to improve barrier properties has been specifically addressed, where the orientation imparted during film production also dramatically affects barrier properties. As an example, an oriented PP film typically exhibits barrier properties 2.0 to 2.5 times better than the barrier properties of the same PP polymer converted into a non-oriented film. Additionally by orienting a PP film, its strength and ductility in the stretch directions are dramatically improved so that the brittleness effect caused by adding substantial amounts of low molecular weight hydrocarbon resin may be overcome.

The use of hydrocarbon resins to improve the barrier properties of polypropylene converted into oriented film is known. However the ability to achieve improved barrier by this method in non-oriented film constructions is poorly defined because incorporating substantial amounts of resin into non-oriented films typically reduce ductility to a level that makes the film product impractical for use. The ability to improve the barrier properties of packaging films made from HDPE or polymers other than polypropylene by using hydrocarbon resins is also poorly defined. The present invention describes how to produce useful HDPE packaging films with superior barrier properties by incorporating hydrocarbon resins, and teaches an effective, cost efficient method for producing these improved films.

HDPE packaging films with improved barrier properties can be produced by the process of melt blending hydrocarbon resin into HDPE polymer to form a blend and extruding blend into a film. HDPE polymers useful in this invention have a density in the range from about 0.940 to 0.970, where products falling in the range about 0.955 to about 0.965 are preferred. Similarly, HDPE of utility in the instant invention may have a melt index (190° C., 2.3 kg. load, as determined by ASTM D-1238) in the range of about 0.1 to about 100 dg./min., but polymers having a melt index between about 0.5 to about 10.0 dg./min. are most preferred for the extrusion processes used to produce the packaging films of this invention. The HDPE films can be made by the cast film process or by the blown film process commonly used to fabricate HDPE packaging films. Other film fabricating techniques suitable for making HDPE packaging films can also be used to produce the films of this invention (e.g., tenter frames).

Hydrocarbon resins (HCR) of utility in this invention are low molecular weight materials derived by polymerizing an olefin feedstock. These resins have a weight average molecular weight Mw of less than about 10,000 Daltons, as determined using size exclusion chromatography (SEC) using polystyrene as a standard. Resins of Mw less than 5,000 Daltons being preferred, for example resins having Mw of at least about 500 Daltons to about 2,000 Daltons being most preferred. The resins may be derived from crude olefin feeds derived from petroleum cracking such as C5 olefin streams, C9 olefin streams, or olefin streams rich in DCPD. The resins may also be produced from terpene olefins, such as limonene derived from citrus products. The resins may also be derived from pure monomer streams such as styrene or methyl styrene monomers. Aliphatic type resins are preferred. Hydrogenated resins with little residual aromatic character are also preferred.

Among the benefits of the instant invention is the production of packaging films with improved moisture barrier properties. Moisture barrier can be measured by the ASTM E-96 method where the moisture vapor transmission rate (MVTR) of films are tested at 100° F., 90% relative humidity. By modifying HDPE films with hydrocarbon resins, reductions in MVTR from 10% to 50% over non-modified films can be achieved.

Because resins are typically friable, dusty materials with low Mw and low melt viscosity, it is difficult to add them to HDPE during the extrusion process in the production of films. An effective method to incorporate resin into HDPE is to first form a masterbatch having a high concentration of resin combined with a polymer carrier. This masterbatch can then be added to the HDPE polymer. The resin in the masterbatch is subsequently blended in with the HDPE polymer during film extrusion. A preferred masterbatch formulation should have as high a resin loading as possible, have good handling characteristics, process well, and be blended well when added to the HDPE polymer during the film forming step.

The invention relates to improved films for packaging applications produced from HDPE polymers where the films exhibit improved barrier properties than conventional films produced from HDPE alone. The improvement consists of incorporating an effective amount of hydrocarbon resin into the HDPE polymer in order to reduce the moisture permeability through the film by more than about 10%, more typically to reduce moisture transmission by about 20% to about 40%. These films are particularly useful for packaging food products which can be negatively affected by either excessive loss of moisture under dry conditions or moisture gain under humid conditions. The invention also relates to a process for producing these films by use of resin masterbatch formulations which can be used to add hydrocarbon resin to a polymer directly during a film forming step.

HDPE polymers used to produce the films of the invention may have a density in the range from about 0.940 to about 0.970, where HDPE polymers having a density falling in the range of about 0.955 to about 0.965 are preferred. The density or the HDPE polymers are as measured at 23° C. according to ASTM D1505. Barrier properties improve as density or crystallinity of the HDPE polymer increases, and for this reason materials with the highest density practical are preferred. The HDPE polymer may have a melt index (190° C., 2.3 kg. load) in the range of about 0.1 to about 100 dg./min., but polymers having a melt index between about 0.5 to about 10.0 dg./min. are most preferred.

Any process suitable for producing films from HDPE polymers may be used in this invention. The films of this invention can be made by an extrusion casting process where polymer is extruded through a slit die onto a casting roll and the polymer is drawn to the final film thickness while in the molten state. The films can also be produced by the blown film process where the polymer is extruded into a cylindrical tube construction which is expanded to the final film thickness using internal air pressure inside the molten polymer tube to expand its dimensions. These are the most common fabricating methods for making HDPE packaging film, although other modified film fabricating techniques such as tenter orientation process can be used to produce the films of this invention.

The resin products useful in this invention can be any low molecular weight polymer derived by polymerizing an olefin feedstock, where the weight average molecular weight ($M_w$) of the material is less than about 20,000 Dalton. Suitable resins have a Mw of less than about 10,000, with hydrocarbon resins of Mw less than 5,000 being preferred, for example resins of at least about 500 to about 2,000 Mw. Mw of the resins are determined using size exclusion chromatography (SEC) using polystyrene as a standard. The resins can be derived from crude olefin feeds produced in the petroleum cracking process. Examples of these crude olefin feeds include a light olefin fraction having an average carbon number of 5 carbon atom per olefin molecule (C5 feeds) or cyclic olefins having an average of 9 carbon atom per olefin molecule (C9 feeds). Resins produced from olefin streams rich in DCPD derived from ethylene cracking can also be used effectively in this invention. Useful resins can also be produced from terpene olefins, such as limonene derived from citrus products. Lastly the resins derived from polymerization of pure monomer streams consisting of styrene, a-methylstyrene, 4-methylstyrene and vinyltoluene can be utilized in this invention. In order to be compatible in HDPE the resin should be essentially aliphatic in character, and for this reason hydrogenated resins with little residual aromatic character are desired. Fully hydrogenated resin products are preferred because of their light color and thermal stability.

One example of a resin useful in this invention is the resin derived from the polymerization of a crude C9 feed stream, followed by catalytic hydrogenation. C9 feedstock is defined as the olefin stream produced during petroleum cracking comprised of hydrocarbon olefin components having about 9 carbon atoms per molecule. Examples of olefins found in a C9 feed include but are not limited to styrene, α-methylstyrene, indene, various methyl substituted indenes, 4-methylstyrene, β-methylstyrene, ethylstyrene, among other olefins. The resultant resin product is aromatic in character, but can be converted to an aliphatic type resin by catalytic hydrogenation. By hydrogenation is meant that residual olefin groups in the resin and the aromatic units in the resin, are converted to saturated species by reduction with hydrogen. Hydrogenation reactions be carried under various conditions, examples being at temperatures in the range of about 150° C. to about 320° C., using hydrogen pressures between about 50 to about 2000 psi. More typically, the hydrogenation would be carried out at temperatures between about 200° C. to about 300° C. to produce the desired product. A typical catalyst for hydrogenating these resins would be Ni metal supported on a carrier such as carbon black. In this class, the preferred type of product would be a resin having more than about 90% of the aromatic units hydrogenated, preferably greater than about 95% of the aromatic units hydrogenated. Examples of this type of resin are Regalite® R-125 resin available from Hercules Incorporated, Middelburg, The Netherlands or Arkons® P-125 resin available from Arakawa Chemical Co.

Another example of a resin effective in this application are resins derived from polymerization of pure monomers such as styrene, α-methylstyrene, 4-methylstyrene, vinyltoluene, or any combination of these or similar pure monomer feedstocks. The product produced by this polymerization is aromatic in character, but can be converted to an aliphatic type resin by catalytic hydrogenation. The process used to hydrogenate these resins is similar to the process, described above, suitable for hydrogenating resins derived from C9 olefin feedstocks. These resins, derived from hydrogenating oligomers of pure monomers, can be hydrogenated to various degrees, where between about 20% to about 100% of the aromatic groups in the resin are reduced to saturated units. Preferably greater than about 90% of the hydrogenated units should be hydrogenated, and more preferred is a degree of hydrogenation greater than about 95%. Examples of these resins are Regalrez® 1139 resin or Regalrez® 1126 resin available from Hercules Incorporated.

Resins useful in this invention can be derived from the polymerization of terpene olefins, examples being the cationic polymerization of monomers such as α-pinene, β-pinene, or d-limonene. These resins are aliphatic-type materials and hydrogenation is not required to achieve aliphatic character. However, hydrogenation to saturate residual olefin groups in the resin can be carried out to produce resins with greater thermal stability which can be likewise used as part of this invention. Examples of resins of this type include Piccolytes® A-135 and Piccolyte® C-125 resins available from Hercules Incorporated.

The most preferred resin for this invention are resins derived by thermally polymerizing olefin feeds rich in dicyclopentadiene (DCPD). Resins of this type can be produced by thermally reacting olefin streams containing between about 50% to about 100% DCPD at temperatures in the range of about 200° C. to about 325° C. to produce resin products which can be hydrogenated to form fully saturated materials with weight average molecular weight ($M_w$) values below about 5000 Daltons. Hydrogenation of these resins is not required, but is greatly preferred to achieve a low color DCPD resin product with good thermal stability. As an example, a DCPD feed containing nominally 85% DCPD, can be converted into a resin product by heating the DCPD to temperatures in the range about 260° C. to about 300° C., for a suitable time, typically in the range of about 10 to about 200 minutes, depending on temperature, to produce a resin which after hydrogenation and stripping to remove volatile components exhibits a Ring and Ball (R&B) softening point in the range of about 100° C. to about 170° C., as determined by ASTM D28-67, aliphatic character, and Mw less than about 5000. An example of this type of resin is Plastolyns® 140 resin available from Hercules Incorporated or Escorez® 5340 resin available from Exxon Chemical Corporation.

Films of the instant invention, which comprise a blend of HDPE and a hydrocarbon resin, exhibit favorable barrier properties. One way to produce films of the instant invention is to add hydrocarbon resin flakes or prills directly to the HDPE molding pellets, and convert the blend directly into a film using the film casting extruder as a mixing device to melt and blend the two components. However because of the friable, dusty nature of hydrocarbon resin products and the low viscosity of these materials at normal plastics processing temperatures, this technique is difficult to practice in commercial applications. Dust problems, and extrusion problems associated with processing blends containing more than 5% hydrocarbon resin, using single screw extruders that are typically used to make HDPE films, make the process troublesome.

Another process for making blends of hydrocarbon resin with HDPE is to combine the ingredients at the proportion desired in the final film, and melt compound the blends using an extruder or batch mixing device capable of blending the ingredients despite the large viscosity mismatch between the resin and the HDPE. Typically this compounding is done in a facility capable of dealing with dusts. After blending the materials, the molten blend is extruded through a multi-hole die and converted into solid pellet form by cooling and cutting the extrudate using typical techniques such as strand pelletization or underwater pelletization. These compounded blends are suitable for being extruded and converted into films under typical commercial conditions. A drawback of this technique is that all the material converted into film has to be run through the compounding step with its associated costs. This process does not provide the film producer with flexibility to alter the amount of resin in the final film.

Another effective way to incorporate hydrocarbon resin into HDPE films is by producing a masterbatch comprised of a high concentration of the resin in a polymeric carrier. By compounding resin in with a polymer dusting of the resin is minimized. Additionally, the polymer blended with the resin increases the melt viscosity so that the masterbatch has a much higher melt viscosity at film processing temperatures than the resin alone. By modifying the viscosity in this manner, the masterbatch can be processed more like a conventional polymer, and it can be compounded more readily into the HDPE polymer during the film extrusion process than the hydrocarbon resin alone can. An important aspect of this invention is the development of novel masterbatch formulations which can manufactured in an economically effective manner for this type application.

Hydrocarbon resin masterbatches of the instant invention comprise from about 60% to about 80% resin, and which may be made with high compounding efficiencies. Preferrably, masterbatches made with high compounding efficiencies which contain from 70% to 80% hydrocarbon resin. These improved masterbatches can be made by using ethylene polymers in combination with the hydrocarbon resin in the masterbatch.

In masterbatches of the instant invention, hydrocarbon resins may be compounded with polyolefins at a level from about 60% to about 80%, preferrably from about 70% to about 80%. Under these conditions, the relative rheological properties of both components are a critical condition for achieving good compounding efficiency. As an example, when polypropylene is the carrier, mixing of the ingredients cannot be achieved until the blend is at about 165° C., representing the melting point of polypropylene at which the polymer turns sufficiently plastic that it can be processed. However at this temperature, the hydrocarbon resin has a very low melt viscosity relative to the polypropylene. The physical act of blending the materials is difficult because of rheological mismatch, requiring excessive mixing time and intensity to blend the materials.

Because low Mw hydrocarbon resins exhibit a very severe viscosity/temperature dependence, small changes in the temperature at which blending occurs can greatly increase the viscosity of the resin and increase the efficiency with which the resin can be blended in with the polymer. Most resins useful for modifying polyolefins have a softening point falling in the range from about 100° C. to about 140° C. In order to achieve high compounding efficiency when making masterbatches containing greater than 60% hydrocarbon resin, the crystalline polyolefin polymer used in the masterbatch must have a crystalline melting point no greater than about 10° C. higher than the Ring and Ball (R&B) softening point of the resin, (obtained through use of ASTM D28-67). Within this constraint, it is desired to use ethylene polymers as a carrier, where the ethylene polymer has a crystalline melting point typically in the range of about 120° C. to about 140° C., and a crystallinity level, as exemplified by the density of the polymer or polymer blend used in the masterbatch, falling in the range 0.87 to 0.965 g/cc. Polymers derived from 1-butene are also suitable because of their low melting point, as are other 1-olefin polymers or copolymers with a melting point falling in the range from about 100° C. to about 140° C.

The ability of a resin/polymer blend to rapidly crystallize to a solid form is also a critical criteria for high compounding efficiency. Polymers such as polypropylene and polybutene crystallize very slowly when compounded into hydrocarbon resins at levels greater than about 60%, and as a result it is difficult to form pellets from these blends at high rates. In contrast, polyethylene type crystallinity develops very rapidly in these blends, even when the polymer concentration is as low as about 20% in the final blend. This fast solidification promotes high compounding efficiencies. As a result, it is preferred that some amount of polyethylene type crystallinity be present in these improved resin masterbatches.

The desired level of crystallinity developed by the polyolefin in these resin masterbatches can be between 10% to 70% based on polymer, and depends on the on both the final application for the masterbatch and the process used to pelletize the masterbatch. When underwater pelletization is used, and fast and complete solidification of the compound to a hard pellet is acceptable and desired, a high crystallinity polymer can be used. In strand pelletization, where the strand must develop resistance to stretching very rapidly, but the strand must remain fairly ductile to prevent breaks, a polymer or polymer blend with an intermediate crystallinity level is desired. In some applications, such as to achieve optimal barrier properties, it is desirable to maximize the crystallinity in the final blend, and as a result high crystalinity in the polymer used in the masterbatch is desired.

The polymer used in these masterbatch formulations can have a melt index (MI) (190° C., 2.16 kg. load) between 0.1 to 10 dg./min. Materials having a higher MI are easier to mix in with the low Mw resin. However blends using a lower MI polymer (higher Mw) have higher melt strength and higher melt viscosity, and as a result are easier to form into strands or pellets, and also have better processing characteristics when the masterbatch is blended in with a polymer during film processing. Because of these conflicting constraints, the polymer used in the masterbatch preferrably has a MI between 0.5–5.0 dg./min.

The modified HDPE films of this invention can be produced by incorporating the resin into the HDPE polymer using any of the techniques described above. The preferred method is the masterbatch method, where compounds containing 50% to 80% resin, preferably 60% to 80% resin, are added to HDPE polymer to form a blend from which the films are directly produced. It is desired that the polymer used in the masterbatch does not detract from the barrier properties of the film, and as a result the preferred polymer is a crystalline polyethylene polymer having a density greater than about 0.91 g./cc.

The HDPE films of this invention exhibit moisture barrier properties which are 10% to 50% better than comparable films containing no resin made from the same HDPE polymer under the same film forming conditions. Because some resins are more effective than others, the required resin addition level depends on the barrier improvement desired and the resin type used.

Examples of hydrocarbon resins used with good effect in HDPE films include MBG 273™ hydrogenated C9 resin, available from Hercules Incorporated, Middelburg, The Netherlands, Regalrez 1139 hydrogenated styrene-vinyl toluene copolymer resin, and Plastolyn® 140 hydrogenated DCPD resin produced by the thermal polymerization of DCPD monomer, both available from Hercules Incorporated, Wilmington, Del. The preferred resin is the hydrogenated product derived from the resin product formed by thermally polymerizing DCPD feedstocks. Examples of this preferred resin type include Plastolyns® 140 resin available from Hercules Incorporated and Escorez® 5300 and Escorez® 5320 resins available from Exxon Chemical Co.

The hydrocarbon resins cam be incorporated into the HDPE films at levels from 3% to 25%, but the preferred level of modification is by incorporating from 3% to 15% hydrocarbon resin into the film. Increasing the resin content typically causes further improvements in the barrier properties of the film, however at the sacrifice of some of the mechanical properties of the HDPE film. The optimal resin add level is typically a trade-off between these two effects.

The following examples will serve to illustrate the invention, parts and percentages being by weight unless otherwise indicated.

EXAMPLES

Examples 1–3

In these examples hydrocarbon resins were compounded into HDPE polymer (Alathon® M6580 HDPE, available from Lyondell Petrochemical Company) which is characterized by a 0.965 density and 9.0 dg./min. melt index. In Example 1 a [20% Plastolyns® 140 DCPD resin (available from Hercules Incorporated)+80% HDPE] blend was premixed and fed to a Brabender D-6 counter rotating twin screw extruder. The extruder temperatures were adjusted from 140° C. to 200° C. and the polymer blend was added at a rate to maintain a starve feed situation in the feed throat. The compounded blend was extruded through a 2 hole die to form two strands which were cooled in a water bath and pelletized.

In Example 2 a similar 20% resin containing compound was prepared except that the hydrocarbon resin blended into the HDPE was Regalrez® 1139 resin from Hercules Incorporated. Similarly in Example 3 MBG 273™ resin, a 140° C. softening point hydrogenated C9 resin, made by Hercules Incorporated, The Netherlands, was compounded at a 20% level in HDPE.

The melting and mixing of the hydrocarbon resins with the HDPE polymer was easy to achieve at this resin level, and no problems with pelletizing the blends were observed. Because of the low resin content in these blends they are not very effective resin masterbatches.

Comparative Example 1

In Comparative Example 1, a cast film sample was prepared by extruding HDPE (Alathon® M6580 HDPE, available from Lyondell Petrochemical Company) into thin films using a ¾" Brabender single screw extruder having a 24/1 L/D ratio. The extruder was connected to a 6" wide adjustable lip film die combined with a film casting apparatus with 5" diameter casting rolls. The film die and die end of the extruder was heated to 250° C., and the extruder speed was adjusted along with the speed of the casting roll to draw the HDPE down to a film with a nominal thickness of about 1.75 mils. The temperature of the primary casting roll was controlled by circulating water at 80° C. through the roll.

Higher cast roll temperatures were required to make cast HDPE films with good appearance and suitable flatness. Samples of cast film prepared by processing HDPE under these conditions were collected for testing.

Examples 4–12

A series of modified HDPE cast films were prepared in which the hydrocarbon resin compounds of Examples 1–3 were combined with HDPE (Alathon® M6580 HDPE, available from Lyondell Petrochemical company) to form resin modified blends which were directly cast into films for testing. In Example 4, one part of the Plastolyn® 140 resin compound of Example 1 was combined with three parts of HDPE and the blend (containing 5% resin) was cast into films with a nominal thickness of about 1.75 mils using the same conditions described in Comparative Example 1. In Example 5, a similar film was made where the composition of the blend was 1 part of the hydrocarbon resin compound of Example 1 combined with 1 part of HDPE (10% resin content). In Example 6, a film was made with a higher 15% resin content by combining 3 parts of the Plastolyn® 140 compound of Example 1 with 1 part of HDPE.

In Examples 7–9, modified HDPE films were made in the same manner as the films in Examples 4–6 except that the Regalrez® 1139 compound of Example 2 was used as the modifier to incorporate hydrocarbon resin into the HDPE film. Likewise in Examples 10–12 modified HDPE films were made in the same manner as in Examples 4 to 6 except that the MBG 273™ resin masterbatch of Example 3 was used to modify the HDPE films.

No problems were observed when extruding the HDPE formulations of Examples 4–12, compared to casting films from the HDPE alone. The resin was blended well into the HDPE when the blends were extruded into films, and no negative effect on extrusion output was noted. Cast films modified with Plastolyn® 140 hydrogenated DCPD resin and MBG 273™ hydrogenated C9 resin had a surface appearance and smoothness similar to or better than the films of Comparative Example 1. Films of Examples 7–9, modified with Regalrez® 1139 resin exhibited a very rough surface texture, but could be converted into thin, pin-hole free films. All the films exhibited the typical HDPE opacity, and exhibited stiffness and ductility similar to the unmodified HDPE film. The moisture barrier properties of these modified films are listed in the Table 1 below. The barrier properties were measured on films having a thickness in the range 1.5–2.0 mils. It was noted that moisture barrier properties improve with increasing film thickness, and all comparisons were done at the same film thickness.

| Example # | Hydrocarbon Resin Content | MVTR (g-mil/day-100 sq.in.) |
| --- | --- | --- |
| Comparative 1 | None | 0.42 |
| Example 4 | 5% Plastolyn ® 140 resin | 0.37 |
| Example 5 | 10% Plastolyn ® 140 resin | 0.30 |
| Example 6 | 15% Plastolyn ® 140 resin | 0.27 |
| Example 7 | 5% Regalrez ® 1139 resin | 0.30 |
| Example 8 | 10% Regalrez ® 1139 resin | 0.30 |
| Example 9 | 15% Regalrez ® 1139 resin | 0.30 |
| Example 10 | 5% MBG 273 ™ resin | 0.35 |
| Example 11 | 10% MBG 273 ™ resin | 0.34 |
| Example 12 | 15% MBG 273 ™ resin | 0.32 |

Regalrez® 1139 resin was very effective for improving moisture barrier at low resin add levels. No additional barrier improvement was noted for resin add levels above 5%. Films modified with Plastolyn® 140 hydrogenated DCPD resin had a very smooth surface appearance and exhibited significant improvements in MVTR, the improvement in moisture barrier increasing as the resin content was increased above 5%. MBG 273™ hydrogenated C9 resin was effective for improving the barrier of HDPE film, but to a lesser degree than Plastolyn® 140 hydrogenated DCPD resin.

Examples 13–15

In Example 13, a physical blend of [50%Plastolyn® 140 hydrogenated DCPD resin and 50% HDPE (Alathon® M6580 HDPE, available from Lyondell Petrochemical Company)] was compounded using a Brabender D-6 twin screw extruder in the same manner as Examples 1 to 3. The ingredients were effectively compounded into a homogenous melt blend. The extruder temperatures were adjusted to minimize the melt temperature so that the compounded extrudate had sufficient melt strength to be formed into (2) strands which were subsequently pelletized. It was noted that the extruded strands solidified to a rigid form almost immediately after entering the water bath, while still in a warm-hot state. The fast set-up is due to the rapid polyethylene crystallization. It was necessary to minimize the cooling time and keep the strands hot to prevent strand brittleness which results in strand breaks.

In Example 14, the masterbatch of Example 13 was combined with HDPE at a 14% level, incorporating 7%Plastolyn® 140 resin in the physical blend. This blend was cast into film with a nominal 1.75 mil thickness in the manner described in Comparative Example 1. In Example 15, the masterbatch of Example 13 was combined with HDPE at a 28% level to incorporate 14% Plastolyns® 140 resin into the blend, and a cast film was prepared from this blend in the same manner as in Example 14.

The films of Examples 14 and 15 were smooth in appearance and exhibited good physical properties. The moisture barrier properties of these films were measured along with the films of Comparative Example 1 and Examples 4–6. These properties are listed in Table 2 below.

| Example # | Plastolyn ® 140 resin (%) | Resin MB Type | MVTR (g-mil/day-100 sq.in.) |
| --- | --- | --- | --- |
| Comparative 1 | None | — | 0.42 |
| Example 4 | 5% | 20% Level | 0.35 |
| Example 5 | 10% | " | 0.28 |
| Example 6 | 15% | " | 0.25 |
| Example 14 | 7% | 50% Level | 0.31 |
| Example 15 | 14% | " | 0.28 |

The films of Examples 14 and 15 made using the high resin concentration masterbatch of Example 13 exhibited good appearance, good mechanical properties, and moisture barrier improvements equivalent to modified films where the hydrocarbon resin was blended into the HDPE at low concentrations. No evidence of insufficient mixing of the Plastolyn® 140 resin into the HDPE films of Examples 14 or 15 was noted. Using a masterbatch with a high loading of hydrocarbon resin is an effective way to incorporate the resin into HDPE films.

Examples 16–17

In Examples 16 and 17, masterbatches containing a high loading of hydrocarbon resin were made using a 32 mm co-rotating twin screw extruder, typical of the type of equipment that is used in the compounding industry and which is appropriate for making resin masterbatch compounds.

In Example 16 a blend comprised of [55%Plastolyn® 140 resin and 45% HDPE (Alathon® M6580 HDPE, available from Lyondell Petrochemical Company)] was fed to the feed throat of a Davis Standard D-Tex 32 mm twin screw extruder. Continuous gravimetric blending was accomplished using a weigh scale blender supplied by Maguire Products. The extruder was run in a starve feed mode using an appropriate screw design and screw speed to effectively compound the materials in one pass. The extruder temperatures and screw speed were adjusted to keep the exit melt temperature around 170° C. The compound efficiency was excellent, and the resin and HDPE could be compounded into a homogeneous extrudate at rates of about 100 lbs./hr. The compounded blend was extruded into (4) strands which were subsequently pelletized. It was noted that the physical mixing of the ingredient into a homogeneous melt could be accomplished at excellent rates, and the extruded strands solidified to a state that could be effectively pelletized with minimal contact in a warm water bath. The overall compounding rate was eventually limited by the maximum speed of the pelletizer to about 70–80 lbs./hr. Attempts to make a masterbatch with a 60%Plastolyn® 140 resin concentration demonstrated that the physical compounding of the ingredients was very efficient, and the extruded strands solidified rapidly and could be easily pelletized. Compounding at a 60% level was as efficient as at the 55% level, except that at the higher resin level the strands tended to embrittle and break, disrupting production. At the 55% level minimal strand breakage occurred.

In Example 16, the maximum resin level that could be compounded effectively was limited by the method used to pelletize the compound. If underwater pelletizing or water ring pelletizing were used, complications from strand breakages were removed, and resin masterbatches with resin loadings of 60% or higher could be made with high production efficiencies. The ease with which the hydrocarbon resin can be physically compounded into the ethylene type polymer, coupled with the very rapid solidification rate of the compounded mixtures, are the critical criteria for achieving high compounding rates and efficiencies.

In Example 17, a blend comprised of [27.5% Regalrez® 1139 resin, 27.5%Plastolyn® 140 resin and 45% HDPE (Alathon® M6580 HDPE, available from Lyondell Petrochemical Company)] was compounded in the same fashion as the masterbatch of Example 16 with similar results.

Comparative Examples 2 and 3

In Comparative Example 2, cast films were made from a cast film grade HDPE polymer with a 0.960 density and 2.0 melt index (Alathon® M6020 HDPE, available from Lyondell Petrochemical Company). Films having a nominal 2.0 mil thickness were prepared from this material by the same procedure described in Comparative Example 1. In Comparative Example 3, a blown film grade HDPE resin having a 0.960 density and 1.0 melt index (Alathon® M6210 HDPE, available from Lyondell Petrochemical Company) was cast into films nominally 2.0 mils thick in the same manner as in Comparative Examples 1 and 2.

Examples 18–21

In these examples., a cast film grade HDPE polymer with a 0.960 density and 2.0. melt index (Alathon® M6020 HDPE, available from Lyondell Petrochemical Company) was modified by blending with either 8% or 15% of the 55% hydrocarbon resin masterbatches described in Examples 16 and 17, translating to either a 4.4% or 8.2% resin add level. Films with a nominal 2.0 mil thickness were cast from these blends in the same manner as described in Comparative Examples 1–3. In Example 18 the Plastolyn® 140 resin masterbatch of Example 16 was added to the cast film grade HDPE polymer at an 8% level, while in Example 19 the level was increased to 15%.

In Example 20, the masterbatch of Example 17, comprised of an equal amount of both Regalrez® 1139 resin and Plastolyn® 140 resin, was added to the cast film grade HDPE polymer at an 8% level. In Example 21 the level of the Example 17 masterbatch in the blend was increased to 15%.

There were no difficulties casting the films of Examples 18–21. The films produced exhibited good appearance and mechanical properties. The moisture barrier properties of these films were measured along with tensile properties, the comparative results listed in Table 3 below.

|  | Comp. Example 2 | Example 18 | Example 19 | Example 20 | Example 21 |
|---|---|---|---|---|---|
| HDPE (%) | 100 | 92 | 85 | 92 | 85% |
| Masterbatch Type | — | Ex. 16 | Ex. 16 | Ex. 17 | Ex. 17 |
| MB Level (%) | — | 8% | 15% | 8% | 15% |
| MVTR (g-mil/day-100 sq. in.) | 0.403 | 0.354 | 0.334 | 0.363 | 0.311 |
| Tensile Modulus (Kpsi) |  |  |  |  |  |
| Machine Direction (MD) | 111 | 106 | 120 | 112 | 117 |
| Transverse Direction (TD) | 118 | 119 | 134 | 118 | 139 |
| Yield Stress (Psi) |  |  |  |  |  |
| MD | 2967 | 3006 | 3057 | 3050 | 3014 |
| TD | 3075 | 3076 | 3210 | 3110 | 3440 |
| Yield Strain (%) |  |  |  |  |  |
| MD | 12.7 | 13.6 | 12.5 | 12.6 | 11.9 |
| TD | 10.4 | 11.8 | 10.5 | 10.6 | 8.9 |

These results demonstrate that hydrocarbon resins can be directly incorporated into HDPE films by blending a resin masterbatch, comprising greater than 50% hydrocarbon resin, in with HDPE polymer and causing the resin masterbatch to be mixed into the HDPE during the film extrusion step.

The films of Examples 20 and 21, into which were added a masterbatch containing both Regalrez® 1139 resin and Plastolyn® 140 resin, exhibited very good appearance and surface properties. By comparison, HDPE films modified with a masterbatch containing Regalrez® 1139 resin alone exhibited irregular surface features. The film of Example 21, modified with the higher 15% masterbatch level, also exhibited modestly better barrier properties than the comparable Example 19 film modified with 15% of the Example 16 masterbatch comprised of Plastolyn® 140 resin.

Examples 22–25

In these examples, HDPE films were prepared in the same manner as in Examples 18 to 21 except that, a blown film grade HDPE with a 0.960 density and 1.0 melt index (Alathon® M6210 HDPE polymer, available from Lyondell Petrochemical Company), was used in the formulations. Films were modified by adding the masterbatches of Examples 16 and 17 to HDPE, and cast films having a nominal 2.0 mil thickness were prepared in the same manner as the films of Examples 18 to 21. The moisture barrier and tensile properties of these films are listed in Table 4 below, and compared to the properties of the unmodified HDPE film of Comparative Example 3.

|  | Comp. Example 3 | Example 22 | Example 23 | Example 24 | Example 25 |
|---|---|---|---|---|---|
| HDPE (%) | 100 | 92 | 85 | 92 | 85% |
| Masterbatch Type | — | Ex. 16 | Ex. 16 | Ex. 17 | Ex. 17 |
| MB Level (%) | — | 8% | 15% | 8% | 15% |
| MVTR (g-mil/day-100 sq. in.) | 0.410 | 0.351 | 0.313 | 0.349 | 0.294 |
| Tensile Modulus (Kpsi) | | | | | |
| (MD) | 108 | 106 | 111 | 116 | 110 |
| (TD) | 125 | 115 | 138 | 125 | 140 |
| Yield Stress (Psi) | | | | | |
| MD | 3029 | 2984 | 3024 | 3054 | 3018 |
| TD | 3312 | 3245 | 3321 | 3237 | 3520 |
| Yield Strain (%) | | | | | |
| MD | 12.7 | 13.4 | 13.1 | 12.3 | 11.5 |
| TD | 9.7 | 11.1 | 10.3 | 9.9 | 8.5 |

The films of Examples 24 and 25, containing Regalrez® 1139 resin in addition to Plastolyn® 140 DCPD resin, exhibited good surface appearance. The film of Example 25 having a 15% masterbatch add level, exhibited modestly better barrier properties than the film of Example 23 modified with a 15% level of the Plastolyn® 140 masterbatch of Example 16.

Examples 26–29 and Comparative Example 4

These examples demonstrates the efficient preparation of hydrocarbon resin masterbatches containing a very high resin level, and the effective use of these masterbatches to prepare modified HDPE films.

In Comparative Example 4, a mixture comprised of [50%Plastolyn® 140 DCPD resin and 50% polypropylene (PDC® 1208 polypropylene, available from Montell USA, Inc.)] was compounded using a Brabender D-6 model co-rotating twin screw extruder. At this resin level, the melt homogeneity was borderline and the compounded strands had barely enough uniformity and continuity to be pelletized. When the pelletized compound was passed through the extruder a second time to improve the homogenaeity of the compound, the strand uniformity increased significantly. However even after the second pass, pelletization of the compound was difficult. The strands remained sufficiently soft that the pelletizer did not cut the strands cleanly, rather the cutting produced a ragged tear with a large degree of strand stretching, turning the pellets opaque white. Attempts to make a similar masterbatch with a 55% resin level failed because of inadequate mixing and because the extruded blend solidified very slowly.

In Example 26, a masterbatch comprised of [75%Plastolyn® 140 resin, 10% HDPE (Alathon® M6580 HDPE, available from Lyondell Petrochemical Company) and 15% polyethylene (Engage® 8440 metallocene PE, available from Dow Chemical Company)] was compounded at the same rate and under similar conditions as Comparative Example 4, using a Brabender D-6 twin screw extruder. The mixture of Example 26 was melt blended in the extruder very effectively, and the melt homogenaeity after the first compounding pass was good. The extruded strands solidified much more rapidly than in Comparative Example 4, and there was no problem pelletizing the masterbatch. Because of the high resin content the extruded strands tended to embrittle excessively if allowed to cool excessively, below about 60° C. Because the Example 26 masterbatch solidified very quickly, but tended to embrittle if cooled to far, a product of this type can be much more effectively pelletized using a die face pelletizing device rather than by strand pelletization.

In Example 27, a blend comprised of [78%Plastolyn® 140 DCPD resin+22% linear low density polyethylene (Stamylex® 1016LF. LLDPE, available from DSM, The Netherlands)] was compounded in the same manner as Example 26 and Comparative Example 4 using a Brabender D-6 twin screw extruder. Stamylex® 1016LF LLDPE is an octene-based LLDPE polymer with a. 0.919 density and 1.1 melt index. Even at this high resin loading, the mixing efficiency and extrudate homogenaeity was very good, and the blended masterbatch could be stranded and pelletized. Even at a 78% resin level the extrudate surprisingly had enough melt strength to be strand pelletized, and the strands solidified so rapidly that pelletizing was no problem. The final masterbatch compound was a crystal clear pellet blend, where the pellets were very brittle, but exhibited minimal dusting or cracking characteristics. The masterbatch of Example 27 containing 78% hydrocarbon resin was prepared at the same rate as the masterbatch of Comparative Example 4, but with fewer compounding difficulties than in Comparative Example 4. To make hydrocarbon resin masterbatch compounds containing more than about 50% resin, it is necessary to select the carrier polymer according to the criteria previously described so that the masterbatch can be compounded at practical rates.

A HDPE film nominally 2.0 mils thick was cast from HDPE (Alathon® M6020 HDPE, available from Lyondell Petrochemical Company) in the same manner as described in Comparative Example 2. In Example 28 a modified HDPE film was produced by combining 13% of the Plastolyn® 140 resin masterbatch described in Example 26 with 87% HDPE and casting films with a nominal 2.0 mil thickness directly from the blends in the same manner described in Comparative Example 2. It was noted that adding the 75% resin masterbatch of Example 26 to make the film of Example 28 had no negative effect on the extrusion of the HDPE polymer. The quality of the films prepared in Example 28 and the processing properties when making those films were equal or superior to the results observed when making the unmodified Comparative Example 2 films.

Example 29 describes another modified HDPE film made by blending 13% of the 78% Plastolyn® 140 resin masterbatch of Example 27 with HDPE in the same manner as in Example 28. The processing characteristics and film quality were not affected by adding the 78% resin masterbatch of Example 27 to the HDPE polymer to prepare the film of Example 29. The hydrocarbon resin was effectively dispersed into the HDPE film by adding the hydrocarbon resin masterbatch of Example 27 to the HDPE and extruding a cast film directly from the blend.

In both Examples 28 and 29, a 10% level of Plastolyn® 140 resin was effectively incorporated into the HDPE film by use of the concentrated resin masterbatches of Examples 26 and 27. No negative effect on film processing were noted due to the use of resin masterbatches with such a high resin loading.

It is not intended that the examples presented here should be construed to limit the invention, but rather they are submitted to illustrate some of the specific embodiments of the invention. Various modifications and variations of the present invention can be made without departing from the scope of the appended claims.

I claim:

1. An oriented polethylene film comprising 3% to 9% by weight of a resin and about 97% to about 91% by weight of a polyethylene wherein the resin has a weight average molecular weight (Mw) of less than 10,000 Daltons, wherein the polyethylene has a density in the range from about 0.94 to about 0.965 g/cc, wherein the resin provides an ASTM E-96 moisture vapor transmission rate reduction of about 10% to 50% in the film compared to an identical film without resin and wherein the film is not cross-linked.

2. The polyethylene film of claim 1 wherein the resin has a weight average molecular weight (Mw) of less than 5,000 Daltons.

3. The polyethylene film of claim 1 wherein the film comprises about 3% to about 7% of the resin.

4. The polyethylene film of claim 1 wherein the resin is derived by thermally polymerizing olefin feeds rich in dicyclopentadiene (DCPD).

5. The polyethylene film of claim 1 wherein the resin is derived from the polymerization of a C9 hydrocarbon feed stream.

6. The polyethylene film of claims 4 or 5 wherein the resin further comprises hydrogenated resin.

7. The polyethylene film of claim 1 wherein the resin is derived from polymerization of pure monomers.

8. The polyethylene film of claim 7 wherein the pure monomers are selected from the group consisting of styrene, alpha-methylstyrene, 4-methylstyrene and vinyltoluene.

9. The polyethylene film of claim 1 wherein the resin is produced from terpene olefins.

10. The polyethylene film of claim 9 wherein the terpene olefins comprise limonene.

11. The polyethylene film of claim 1 wherein the polyethylene film comprises a cast film.

12. The polyethylene film of claim 10 wherein the oriented film comprises biaxially oriented film.

13. The polyethylene film of claim 12 wherein the oriented film is produced through a blown film process.

14. The polyethylene film of claim 12 wherein the biaxially oriented film is produced through a tenter frame orientation process.

15. A process of producing the polyethylene film of claim 1 comprising the steps of a) blending the polyethylene with the resin to form a blend and b) extruding the blend to form the film.

16. An oriented polyethylene film comprising 3% to 9% by weight of a resin and about 97% to about 91% by weight of a polyethylene wherein the resin has a weight average molecular weight (Mw) of less than 10,000 Daltons, wherein the polyethylene has a density within the range of about 0.95 to about 0.970 g/cc, wherein the film is not cross-linked.

* * * * *